US006736367B2

(12) United States Patent
Scobie

(10) Patent No.: US 6,736,367 B2
(45) Date of Patent: May 18, 2004

(54) HOSE COUPLING LOCK FOR A VALVE AND METHOD OF USE OF THE SAME

(76) Inventor: David Scobie, P.O. Box 271, Paradise Hill, Saskatchewan (CA), S0M 2G0

( * ) Notice: Subject to any disclaimer, the term of this patent is extended or adjusted under 35 U.S.C. 154(b) by 93 days.

(21) Appl. No.: 10/147,242

(22) Filed: May 15, 2002

(65) Prior Publication Data

US 2002/0171057 A1 Nov. 21, 2002

(30) Foreign Application Priority Data

May 16, 2001 (CA) .............................................. 2347616

(51) Int. Cl.[7] ................................................ F16L 37/28
(52) U.S. Cl. .................................. 251/149.9; 251/89.5
(58) Field of Search .............................. 251/149.9, 279, 251/89, 89.5, 90, 92; 137/614.06

(56) References Cited

U.S. PATENT DOCUMENTS

| 408,273 | A | * | 8/1889 | Trask et al. ............... 251/149.9 |
| 2,048,936 | A | * | 7/1936 | Kremser ................ 251/89.5 X |
| 2,080,485 | A | * | 5/1937 | Johnsen ................. 251/89.5 X |
| 2,147,084 | A | * | 2/1939 | Bouchard .............. 251/89.5 X |
| 2,773,706 | A | | 12/1956 | Leavell ......................... 284/19 |
| 3,301,272 | A | * | 1/1967 | Pettyjohn et al. ...... 137/614.06 |
| 3,664,375 | A | * | 5/1972 | Marette ................. 137/614.04 |
| 3,982,563 | A | | 9/1976 | Kowal et al. ............... 137/798 |
| 4,103,712 | A | * | 8/1978 | Fletcher et al. ...... 251/149.9 X |
| 4,397,332 | A | | 8/1983 | Sample ........................ 137/385 |
| 4,458,923 | A | | 7/1984 | Burroughs ..................... 285/8 |
| 4,515,182 | A | * | 5/1985 | LeDevehat ............. 137/614.06 |
| 4,538,746 | A | * | 9/1985 | Hines ..................... 251/89.5 X |
| 4,982,929 | A | | 1/1991 | Spurling .................. 251/149.9 |
| 5,005,602 | A | * | 4/1991 | Fahl .................. 137/614.06 X |
| 5,193,366 | A | | 3/1993 | Brinkman ...................... 70/18 |
| 5,219,147 | A | | 6/1993 | Fultz et al. .................... 251/90 |
| 5,383,492 | A | | 1/1995 | Segal ..................... 137/614.06 |
| 5,404,909 | A | * | 4/1995 | Hanson ................. 137/614.06 |
| 5,535,984 | A | | 7/1996 | Anderson et al. ........ 251/149.8 |

* cited by examiner

*Primary Examiner*—Gene Mancene
*Assistant Examiner*—Eric Keasel
(74) *Attorney, Agent, or Firm*—Christensen O'Connor Johnson Kindness PLLC

(57) ABSTRACT

A method and apparatus for locking a hose onto a hose coupling for a valve. A rigid linkage is pivotally mounted adjacent to the valve with a hose engaging member at a first end and an actuator engaging member at a second end. The linkage is pivoted to position the hose engaging member in the engaged position overlying and maintaining in engagement a hose with the hose coupling. A manual valve actuator of the valve is moved to a first position with the valve open. The actuator engaging member engages the manual valve actuator to prevent pivoting of the linkage and maintain the hose engaging member in the engaged position until the manual valve actuator has been returned to a second position with the valve closed.

7 Claims, 4 Drawing Sheets

HOSE COUPLING LOCK FOR A VALVE AND METHOD OF USE OF THE SAME

FIELD OF THE INVENTION

The present invention relates to a hose coupling lock for a valve and a method of using the hose coupling lock.

BACKGROUND OF THE INVENTION

Many valves have associated hose couplings. Such hose couplings are used to attach hoses. If a hose is inadvertently detached from the hose coupling when the valve is open, fluids spray onto the worker who is in the process of detaching the hose and surrounding environment. If the fluid passing through the valve is heated or caustic, injuries and property damage may occur.

SUMMARY OF THE INVENTION

What is required is a hose coupling lock for a valve that will prevent a hose from being detached from a hose coupling when the valve is in the open position.

According to one aspect of the present invention there is provided a hose coupling lock for a valve which includes a support and a rigid linkage pivotally mounted to the support. The linkage has a first end and a second end. A hose engaging member is positioned at the first end of the linkage. An actuator engaging member is positioned at the second end of the linkage. By pivoting the rigid linkage, the hose engaging member is movable between an engaged position and a disengaged position. In the engaged position the hose engaging member overlies and maintains in engagement a hose with a hose coupling of a valve. The actuator engaging member engages a manual valve actuator of the valve when in a first position with the valve open to prevent pivoting of the rigid linkage and maintain the hose engaging member in the engaged position until the manual valve actuator has been moved to a second position with the valve closed.

The hose coupling lock for a valve, as described above, is effective to prevent a hose from being detached from a hose coupling when the valve is in the open position. The hose engaging member remains engaged to maintain the hose in position on the hose coupling until the manual actuator has been physically moved to place the valve in the closed position. When the valve is placed in the closed position, the linkage can be freely pivoted to move the hose engaging member to the disengaged position and enable the hose to be disengaged from the hose coupling.

According to another aspect of the present invention there is provided a method of locking a hose onto a hose coupling for a valve that has a manual valve actuator with a first position and a second position, in the first the valve being open and when in the second position the valve being closed. A first step involves pivotally mounting a rigid linkage adjacent to the valve. The linkage has a first end and a second end. A hose engaging member is positioned at the first end of the linkage. An actuator engaging member is positioned at the second end of the linkage. By pivoting the linkage, the hose engaging member is movable between an engaged position and a disengaged position. A second step involves pivoting the linkage to position the hose engaging member in the engaged position overlying and maintaining in engagement a hose with the hose coupling of the valve. A third step involves moving the manual valve actuator to the first position with the valve open. The actuator engaging member engages the manual valve actuator to prevent pivoting of the linkage and maintain the hose engaging member in the engaged position until the manual valve actuator has been returned to the second position with the valve closed.

Although the form of rigid linkage may vary, beneficial results have been obtained through the use of a "Z" shaped linkage having an upper arm, a lower arm and a diagonal connective member. The linkage is pivotally secured by a horizontal pivot pin the extends through the linkage where the lower arm meets the diagonal connective member.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
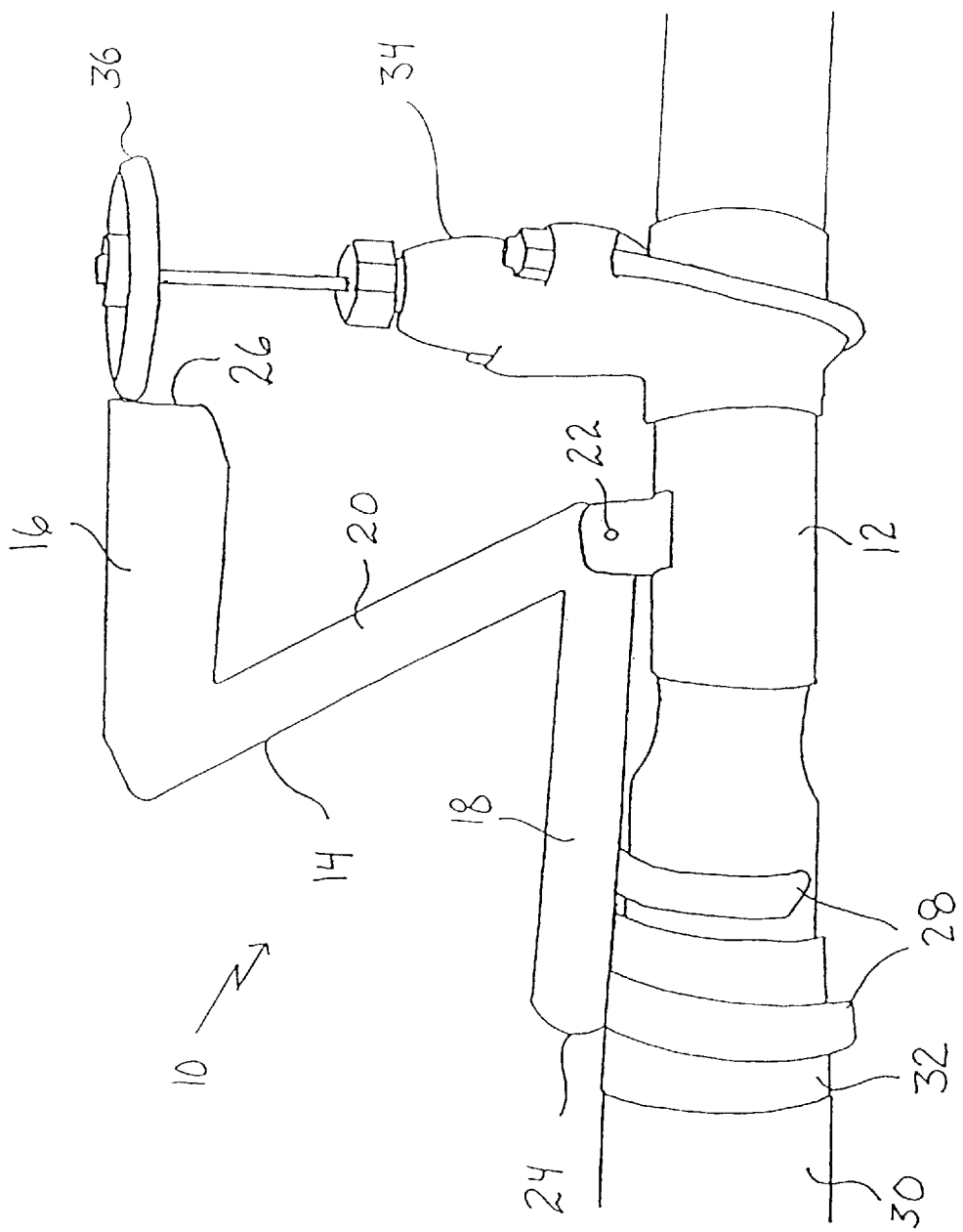
FIG. 1 is a side elevation view of a hose coupling lock for a valve constructed in accordance with the teachings of the present invention with the hose engaging member in an engaged position.

The preferred embodiment, a hose coupling lock for a valve generally identified by reference numeral 10, will now be described with reference to FIGS. 1 and 2.

Figure 2:
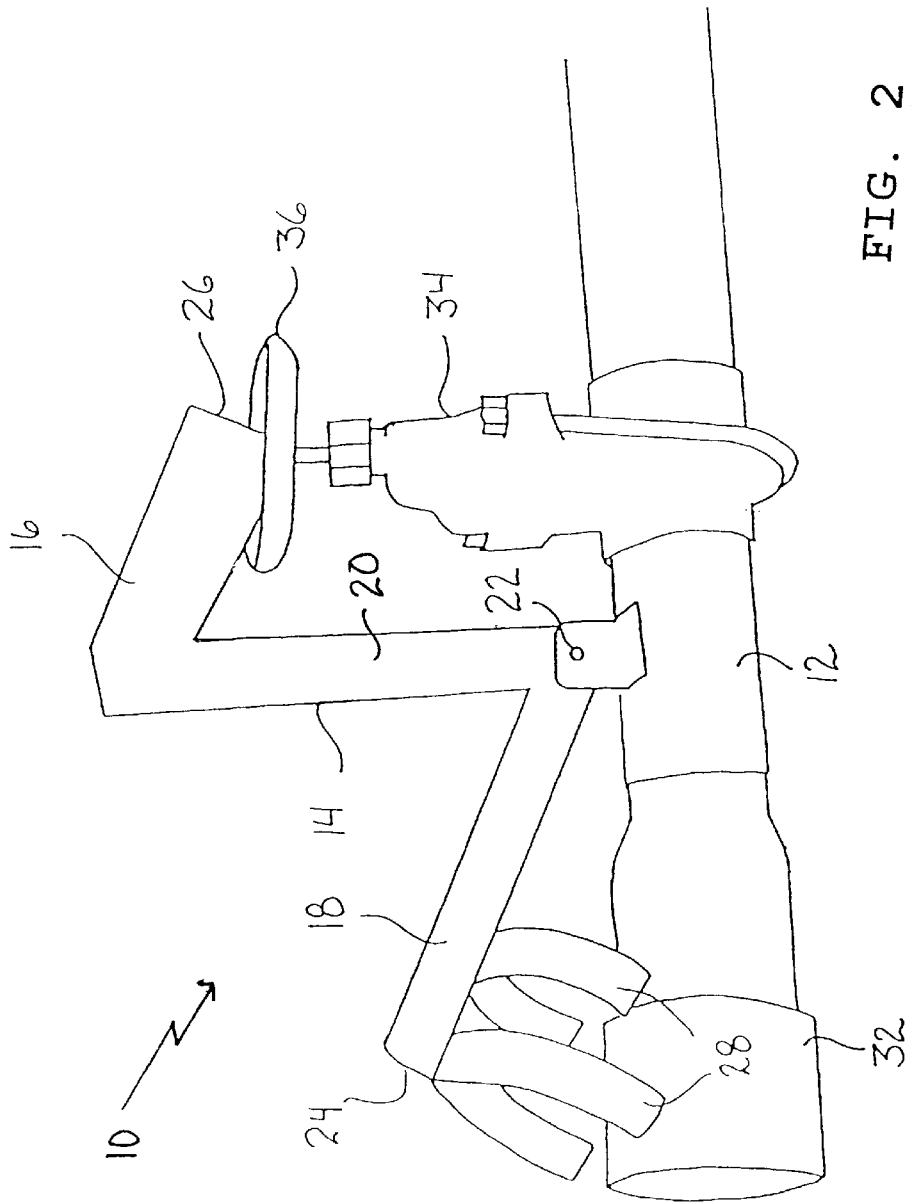
FIG. 2 is a side elevation view of the hose coupling lock for a valve illustrated in FIG. 1, with the hose engaging member in a disengaged position.

Structure and Relationship of Parts:

Referring to FIG. 1, there is provided a hose coupling lock 10 which includes a support collar 12 and a rigid "Z" shaped linkage 14. Linkage 14 has an upper arm 16, a lower arm 18 and a diagonal connective member 20. Linkage 14 is pivotally secured to support collar 12 by a horizontal pivot pin 22 that extends through linkage 14 where lower arm 18 meets diagonal connective member 20. Linkage 14 has a first end 24 and a second end 26. Arcuate hose engaging members 28 are located at first end 24 of linkage 14. Hose engaging members 28 are movable between an engaged position as illustrated in FIG. 1 and a disengaged position as illustrated in FIG. 2. Referring to FIG. 1, in the engaged position, hose engaging members 28 overlie and maintains in engagement a hose 30 with a hose coupling 32 of a valve 34. Valve 34 has a manual actuator 36. When manual actuator 36 is in a first position with valve 34 open, as illustrated in FIG. 1, second end 26 of linkage 14 serves as an actuator engaging member. If an attempt is made to pivot linkage 14 to move hose engaging member 28 to the disengaged position, second end 26 engages manual actuator 36 to prevent such pivotal movement. The positioning of manual actuator 36 interferes with the pivotal movement of linkage 14, thereby maintaining hose engaging member 28 in the engaged position with hose 30. This prevents hose 30 from being removed from hose coupling 32. Referring to FIG. 2, when manual actuator 36 is moved to a second position with valve 34 closed, linkage 14 is free to pivot and can be positioned so that hose engaging member 28 is in the disengaged position spaced from hose 30 and hose coupling 32 so hose 30 can be disengaged from hose coupling 32. In the illustrated embodiment, manual actuator 36 is shown as being a rotating wheel, however other types of manual actuators 36 could also be used. The key factor is that the manual actuators must interfere with the pivoting of linkage 14 when in the open position.

Operation:

The use and operation of hose coupling lock 10 will now be described with reference to FIGS. 1 and 2. Referring to FIG. 1, hose coupling lock 10, as described above, is effective in preventing hose 30 from being detached from hose coupling 32 when valve 34 is in the open position. When valve 34 is in the open position, manual actuator 36 prevents movement of linkage 14 as second 26 end of linkage 14 will brace against manual actuator 36 if any attempt is made to move linkage 14 without first closing valve 34. Hose engaging member 28 remains engaged to maintain hose 30 in position on hose coupling 32 until manual actuator 36 has been manually moved to place valve 34 in the closed position. Referring to FIG. 2, when valve 34 is placed in the closed position, linkage 14 can be manually pivoted to move hose engaging member 28 away to enable hose 30 to be disengaged from hose coupling 32.

Figure 3:
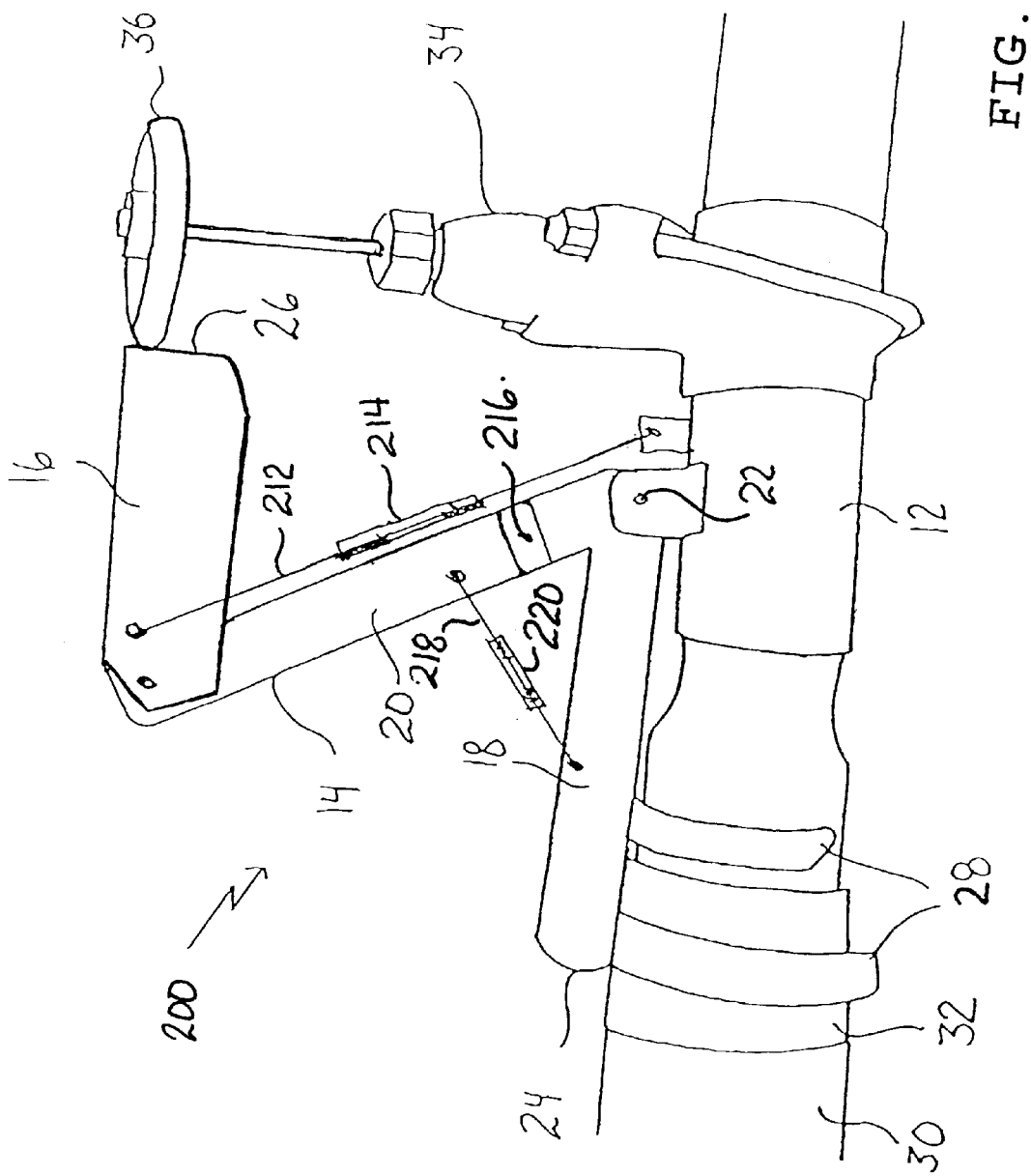
FIG. 3 is a side elevation view of an adjustable hose coupling lock for a valve constructed in accordance with the teachings of the present invention with the hose engaging member in an engaged position.
Figure 4:
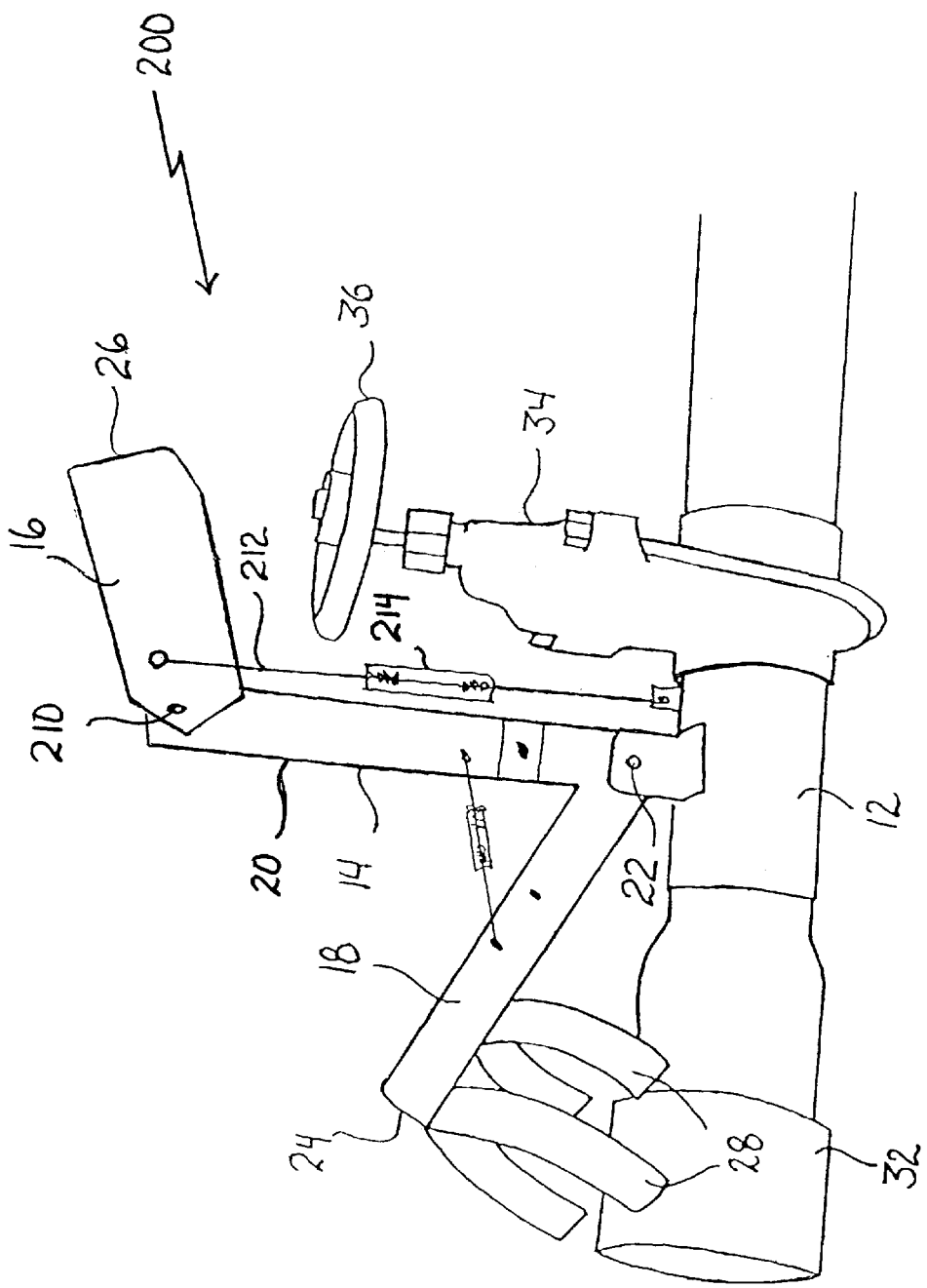
FIG. 4 is a side elevation view of an adjustable hose coupling lock illustrated in FIG. 3, with engaging member pivoted to the disengaged position.

Variations:

Referring to FIGS. 3 and 4, there is illustrated an adjustable version of hose coupling lock 10, which is generally identified by reference numeral 200. The components of this version of hose coupling lock 10 will be identified by the same reference numeral as used in the description above so that only the differences need to be identified and specifically described.

Referring to FIG. 3, adjustable version of hose coupling lock 200 allows for hose coupling lock 200 to be adjusted to fit differing sizes and configurations of valves. With hose coupling lock 200 upper arm 16 of rigid "Z" shaped linkage 14 is secured to linkage at a pivot point 210. A tension line 212 extends from upper arm 16 to support collar 12. A tension buckle 214 is provided on tension line 212 for the purpose of adjusting the tension of tension line 211 and therefore the positioning of upper arm 16 as illustrated in FIGS. 3 and 4. Diagonal connective member 20 also has a pivot point 216. A tension line 218 extends from diagonal connective member 20 to lower arm 18 of linkage 14. Tension line 218 also has a turn buckles 220 which can be used to adjust the tension in tension line 218.

By following the teachings of this invention hose coupling locks can be made in various sizes to accommodate differing sizes of valves. The hose coupling locks can be made from various materials. A material should be selected which is compatible with the fluid passing through the valve.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A hose coupling lock for a valve, comprising:

a support;

a linkage pivotally mounted to the support, the linkage having a first end and a second end;

a hose engaging member at the first end of the linkage;

an actuator engaging member at the second end of the linkage;

such that by pivoting the linkage, the hose engaging member is movable between an engaged position and a disengaged position, in the engaged position the hose engaging member overlies and maintains in engagement a hose with a hose coupling of a valve, the actuator engaging member engaging a manual valve actuator of the valve when in a first position with the valve open to prevent pivoting of the linkage and maintain the hose engaging member in the engaged position until the manual valve actuator has been moved to a second position with the valve closed.

2. The hose coupling lock as defined in claim 1, wherein the linkage is a rigid linkage.

3. The hose coupling lock as defined in claim 1, wherein the linkage is an adjustable linkage which is capable of being locked in a selected rigid configuration.

4. The hose coupling lock as defined in claim 1, wherein the adjustable linkage has pivotally connected arms locked in a selected rigid configuration by tension lines with turnbuckles.

5. A hose coupling lock for a valve, comprising:

a support collar;

a rigid "Z" shaped linkage having an upper arm, a lower arm and a diagonal connective member, the linkage being pivotally secured to the support collar by a horizontal pivot pin the extends through the linkage where the lower arm meets the diagonal connective member, the linkage having a first end and a second end;

at least one arcuate hose engaging member at the first end of the linkage;

an actuator engaging member at the second end of the linkage;

such that by pivoting the rigid linkage, the hose engaging member is movable between an engaged position and a disengaged position, in the engaged position the hose engaging member overlies and maintains in engagement a hose with a hose coupling of a valve, the actuator engaging member engaging a manual valve actuator of the valve when in a first position with the valve open to prevent pivoting of the rigid linkage and maintain the hose engaging member in the engaged position until the manual valve actuator has been moved to a second position with the valve closed.

6. A method of locking a hose onto a hose coupling for a valve that has a manual valve actuator with a first position and a second position, in the first the valve being open and when in the second position the valve being closed, comprising the steps of:

pivotally mounting a linkage adjacent to the valve, the linkage having a first end and a second end, a hose engaging member being positioned at the first end of the linkage and an actuator engaging member being positioned at the second end of the linkage, such that by pivoting the linkage, the hose engaging member is movable between an engaged position and a disengaged position;

pivoting the linkage to position the hose engaging member in the engaged position overlying and maintaining in engagement a hose with the hose coupling of the valve;

moving the manual valve actuator to the first position with the valve open, the actuator engaging member engaging the manual valve actuator to prevent pivoting of the linkage and maintain the hose engaging member in the engaged position until the manual valve actuator has been returned to the second position with the valve closed.

7. The method as defined in claim 6, the linkage being "Z" shaped with an upper arm, a lower arm and a diagonal connective member, the linkage being pivotally secured by a horizontal pivot pin the extends through the linkage where the lower arm meets the diagonal connective member.

* * * * *